United States Patent
Vadura et al.

(10) Patent No.: US 9,740,523 B2
(45) Date of Patent: Aug. 22, 2017

(54) OPTIMIZING STREAM-MODE CONTENT CACHE

(71) Applicants: Dennis Vadura, Trabuco Canyon, CA (US); Wei Kang Tsai, Irvine, CA (US)

(72) Inventors: Dennis Vadura, Trabuco Canyon, CA (US); Wei Kang Tsai, Irvine, CA (US)

(73) Assignee: Badu Networks, Inc., Irvine, CA (US)

( * ) Notice: Subject to any disclaimer, the term of this patent is extended or adjusted under 35 U.S.C. 154(b) by 521 days.

(21) Appl. No.: 14/447,349

(22) Filed: Jul. 30, 2014

(65) Prior Publication Data

US 2016/0036879 A1    Feb. 4, 2016

(51) Int. Cl.
- *G06F 15/16*    (2006.01)
- *G06F 9/48*    (2006.01)
- *H04L 29/08*    (2006.01)
- *H04L 29/06*    (2006.01)

(52) U.S. Cl.
CPC ............ *G06F 9/4881* (2013.01); *H04L 67/02* (2013.01); *H04L 67/2842* (2013.01); *H04L 69/16* (2013.01); *H04L 69/30* (2013.01); *H04L 69/321* (2013.01)

(58) Field of Classification Search
CPC ... H04L 61/6009; H04L 69/16; H04L 69/166; H04L 67/2842; H04L 67/1097; G06F 17/30902
USPC .................................................. 709/217, 219
See application file for complete search history.

(56) References Cited

U.S. PATENT DOCUMENTS

| | | | |
|---|---|---|---|
| 7,779,164 B2 * | 8/2010 | Hendel | H04L 47/10 370/464 |
| 2009/0240874 A1 * | 9/2009 | Pong | G06F 12/0223 711/105 |

* cited by examiner

*Primary Examiner* — Wing F Chan
*Assistant Examiner* — Andrew Woo

(57) ABSTRACT

A hybrid modular appliance or electronic device allows a user to plug a number of snap-together component modules of different types into a base device, so that the resulting assembly performs a custom-designed functionality. With no attached component modules, the base device functions as a standalone consumer or office appliance. At least one component module has its functionality not supporting the functionality of the base device, thereby allowing the resulting assembly a hybrid device. Examples of the hybrid modular devices include a TV-Wi-Fi-router, and a TV-storage-DVR-Wi-Fi-router. A hybrid modular device can serve as a videoconference device, a music jukebox, or a home theater unit.

9 Claims, 2 Drawing Sheets

Data structures and data flow for a TCP proxy with content cache.

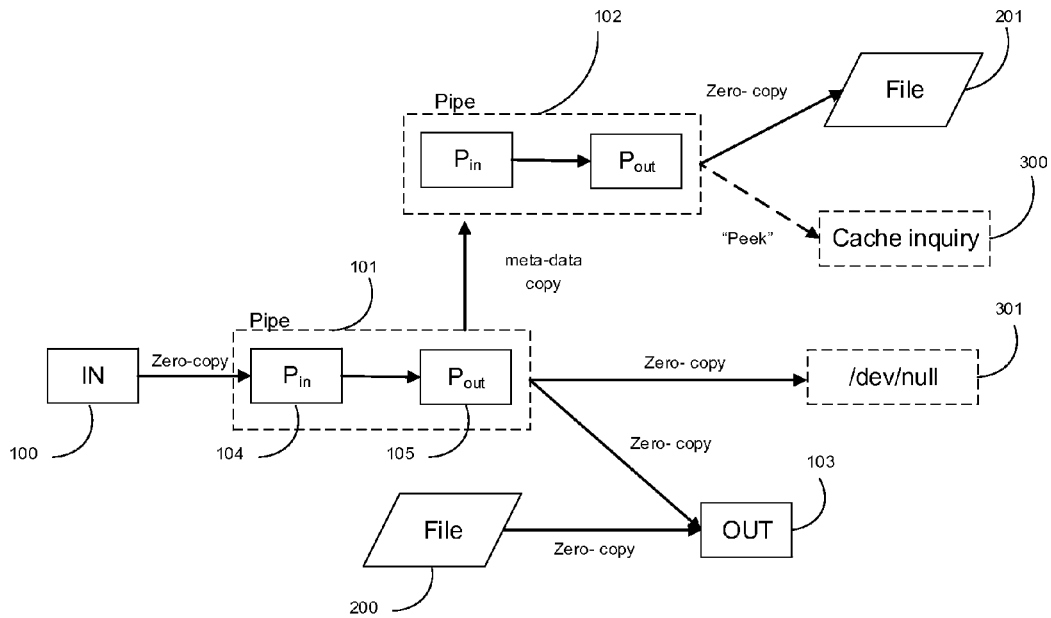
FIG. 1 Data structures and data flow for a TCP proxy with content cache.
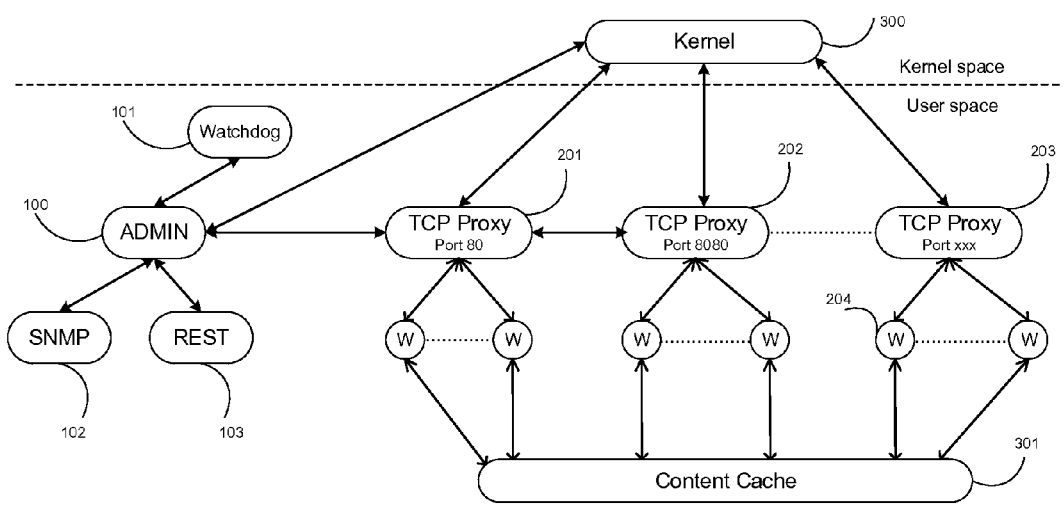
FIG. 2 Process structure for a TCP proxy with content cache.

| CPU/Process | CPU-0 | CPU-1 | CPU-2 | CPU-3 | CPU-4 -> CPU-31 |
|---|---|---|---|---|---|
| ADMIN | X | | | | |
| SNMP | X | | | | |
| REST | X | | | | |
| Watchdog | X | | | | |
| Content Cache | | X | X | X | |
| TCP Proxy 1 | | | | | X |
| TCP Proxy 2 | | | | | X |
| .... | | | | | ... |
| TCP Proxy x | | | | | X |

FIG. 3 FP-assigned CPU mapping for a TCP proxy with content cache

OPTIMIZING STREAM-MODE CONTENT CACHE

CROSS REFERENCES TO RELATED APPLICATIONS

The present Application claims priority to U.S. Provisional Patent Application No. 61/860,004 filed on Jul. 30, 2013, which is hereby incorporated by reference in its entirety.

FIELD OF THE INVENTION

The present invention relates in general, to stream-mode data transfer and caching, and in particular, to optimization of stream-mode data transfer with caching, with zero-copy techniques, on multi-core computing devices.

BACKGROUND OF THE INVENTION

In modern data networking, stream is an essential mode of communication. In the stream mode, the receiver end of a data channel is always expecting data until the channel is torn down.

The stream mode is used extensively in the Internet—at the transport layer, both TCP (transmission control protocol) and UDP (user datagram protocol) operate in the stream mode. At the application layer, videos and audios are often streamed directly from a server to a user device. For live broadcasts, stream is the only possible mode of communication.

A challenge in the streaming mode is the efficiency of data transfer from one stream to another. Data transfer is at the heart of numerous applications, and the efficiency of data transfer is often the critical factor to determine performance. For example, stream-mode data transfer is essential for TCP splicing, which is a useful method to accelerate all types of web applications.

TCP splicing is especially important for deploying TCP optimization solutions. It is estimated that by 2017, there will be 50 billion TCP-running devices online. When there is an improved TCP implementation, it is impossible to deploy the new solution by replacing all the TCP stacks that might be involved. A feasible deployment strategy is to insert TCP splicing boxes in the paths between the possible set of servers and the possible set of clients. TCP splicing is probably the only form of solution possible to optimize TCP throughput, when it is required not to touch the server, or the client, or both.

In TCP splicing, a TCP proxy is placed at an intermediate node between a sender and a receiver. The original TCP connection between the sender and receiver is replaced by a TCP connection between the origin sender and the proxy, and a second TCP connection between the proxy and the receiver. In TCP splicing, data sent from the origin sender is temporarily stored at the proxy—the stored data is sent to the receiver opportunistically as bandwidth to the receiver becomes available.

TCP splicing is a 2-edged sword: while it can increase the speed of data delivery, it also adds latency incurred at the proxy. At a TCP proxy, the largest component of latency is in the data transfer between the input stream and the output stream.

To further improve the speed of data delivery, a content cache is often added to all types of Web applications. Therefore, content caches are often added to TCP proxies.

With content caching, there are 3 types of data transfer at a TCP proxy—from an input stream to an output stream, from a content cache file to an output stream, from an input stream into a content cache file. It is critical to minimize the latency associated with all 3 types of data transfer.

The performance issue of data transfer is rooted at the extra data copying added to the straight data transfer. The extra data copying is often caused by the OS (operating system) to switch the context between kernel space and user space, or for other performance and security reasons. The industry has put in lots of effort to minimize the excess data copying, and many zero-copy solutions have become available.

Copying in the stream mode is tricky as there is no clear boundary between data chunks. In the stream mode, since buffer space is always limited, earlier data could be overwritten by later data. Reading from a stream could cause some previously read data to be flushed from memory—stream-mode reads could be destructive. Furthermore, if a piece of read data is to be used for another purpose, it has to be copied. However, copying is an expensive operation between memory units of disparate speeds. Copying between kernel space and user space is also expensive because of context switching.

Besides data copying, a content cache or a stream-mode data-transfer device should be further optimized to reduce processing latency related to hardware. Today, as the silicon clock speed has reached a plateau, most computers are built using MPSoC (multi-processor system on chip) devices. In such a system, there are multiple cores or CPUs (central processing units) on the same chip, while all CPUs share the same on-chip cache and the main memory.

As a rule, on-chip caches are organized according to decreasing speed and increasing size. If a CPU needs to access a block of data or instructions, it goes to the fastest L1 (level 1) cache first. If there is a cache miss, it has to go down in the memory hierarchy to L2-L4 (level 2-level 4) caches, which are progressively slower and increasingly larger in size.

As on-chip memory is shared, the control and management in a multi-core system is much more complicated than a single-processor system. For example, the same cache or memory location could be contended by multiple CPUs. In addition, the controller must maintain data consistency in the local caches of a shared resource. These and other issues make a cache miss very expensive in latency. To minimize latency, a new approach for writing computer codes on MPSoC devices has emerged. In the new approach, the priority is to maximize cache hits.

The demand for accelerating data transfer in the stream mode is strong and persistent in the Internet era. Therefore, there is a need to minimize data copying and the associated latency for applications requiring stream-mode data transfer, with possible caching, over multi-core computers.

BRIEF SUMMARY OF THE INVENTION

According to one aspect of the present invention, a system and method, comprising 2 components—referred to as ADD (adaptive data descriptor) and FP (functional proximity)—optimizes stream-mode data transfer. When applied in an integrated manner, these 2 methods enable zero copying, while minimizing the associated latency for stream-mode data transfer with or without caching, over an MPSoC device.

According to one aspect, the present invention is applied to a TCP splicing proxy with content cache at an intermediate node between a sender and a receiver.

According to some aspects of the present invention, when ADD is applied to a TCP splicing proxy, an exemplary data structure and data flow is depicted in FIG. 1.

According to some aspects, using system calls that manipulate meta-data (the data pointing to the location of real data), ADD allows data transfer in the stream mode without additional data copying between an input buffer and an output buffer.

According to some aspects, a preferred embodiment of the meta-data is a data descriptor, which is a pointer to a block of data. In the current Linux operating system (OS), an exemplary embodiment is the file descriptor.

According to some aspects, an input stream is manipulated by copying the meta-data associated with the input stream into a linear array. In the current Linux OS, an embodiment of a linear array is a pipe.

According to some aspects, to avoid destructive read, a pipe of meta-data is copied into another pipe for "peeking" Peeking is an operation to read (in part or in full) the data indicated by some meta-data without destroying the data in the stream pointed to by the meta-data.

According to some aspects, for web applications, an HTTP (hypertext transfer protocol) command does not have to be read in its entirety. Once sufficient information is "peeked" from an HTTP command—for example, a partial URL in an HTTP GET command—a cache hit determination can be made.

According to some aspects, both read and write operations to and from a stream are done via the meta-data associated with the stream. In essence, the meta-data of an input stream is transferred as the meta-data for an output stream, thereby avoiding an extra movement of the real data.

According to one aspect of the present invention, FP is a method to assign processes and threads to different CPUs or cores in a multi-core computer. The purpose is to minimize both cache misses and cache accesses, or to maximize cache hits, in shared on-chip caches.

According to some aspects, FP is a method further comprising 2 methods. The first method assigns processes to CPUs or cores based on a priori information regarding the processes and functional proximity of the processes. The second method assigns individual threads, as they are created, to different thread groups. Each thread group is assigned to a single CPU or core.

According to some aspects, when applied to a TCP splicing proxy, the second method of FP assigns one worker thread of a TCP proxy process to perform the proxy function for one TCP connection. Optionally, the method assigns 2 treads to one TCP connection, one thread for one direction (upstream or downstream) between the sender and receiver of the original TCP connection.

BRIEF DESCRIPTION OF THE DRAWINGS

The above and other objects and features in accordance with the present invention will become apparent from the following descriptions of embodiments in conjunction with the accompanying drawings, and in which:

FIG. 1 depicts the data structure and data flow according to ADD, for a TCP proxy with content cache.

FIG. 2 depicts the process structure for a TCP proxy with content cache.

FIG. 3 illustrates FP-assigned CPU mapping according to FP, for a TCP proxy with content cache.

DETAILED DESCRIPTION OF EXEMPLARY EMBODIMENTS

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

The motivation for the present invention is latency minimization in stream-mode data-transfer, with or without caching. In particular, the present invention is designed to make TCP-splicing a viable deployment choice for mobile or fixed broadband service providers. These providers do not own the servers that serve content to end customers. To optimize TCP performance without touching the servers, or the clients, or both, TCP splicing with negligible latency is an excellent deployment candidate.

TCP splicing is unattractive if the latency of data transfer in a TCP splicing proxy is significant. A purpose of the present invention is to make TCP splicing a viable deployment choice for mobile and fixed broadband providers, by zero copying and minimizing the total latency of data transfer in a TCP proxy.

The present invention is a system and method, comprising 2 methods, ADD (adaptive data descriptor) and FP (functional proximity), for the purpose of minimizing data copying and associated latency in stream-mode data transfer, with possible content caching, over multi-core computing systems.

The first method (ADD) is said to be adaptive because the method allows elastic speed matching between the arrival of data in an input stream and the departure of data in an output stream. The data that is dynamically stored in a TCP splice proxy can grow or shrink, depending on the speed of input-stream data arrival relative to the speed of output-stream data departure. Further, ADD is adaptive as it allows peeking data from an input stream in part or in full, depending on the application.

ADD allows reading from an input stream and writing into an output stream without having any additional copies of the stream. Further, ADD allows a non-destructive "peek" (which may be a partial read) of input-stream data. ADD allows copying from an input stream into a file, while simultaneously copying from the same input stream to an output stream, without any additional copies of the input stream. ADD also allows copying from a file into an output stream, without any additional copies from the file.

FP minimizes cache misses and cache access in MPSoC devices for stream-mode data transfer with or without caching, by assigning processes and threads to different CPUs or cores. The 2 methods, ADD and FP should be jointly applied to minimize processing latency in multi-core computers.

To reduce latency, it is critical to minimize the consumption of CPU and memory resources. As most computers today are built using MPSoC devices, it makes no sense to optimize a computer code without considering critical hardware resources such as CPU and memory.

For example, even when ADD is applied in the design of data structure and data flow, if the processor assignment is not done to match the data structure, the resulting latency can still be significant, thereby cancelling the benefits of ADD. If the data structure and data flow are not optimized (with ADD or other methods), applying FP alone may not yield sufficient benefits.

"Zero copy" is a term that has been misused—it refers to a collection of techniques that reduces the number of data copies in a data transfer. It does not necessarily mean "zero copy," as at least one copy (from input to output) is necessary in any data transfer.

According to ADD, system calls or services from the OS are used to set up a path from an input stream to an output stream. This path comprises only data descriptors, or meta-data that are pointers to the real data.

In the current Linux OS, splice is a system call that sets up a data transfer path between different buffers in kernel memory, without a copy of the data in either kernel or user space. Using the splice system call, the file descriptor associated with the sender (input) kernel buffer is transferred and becomes to the file descriptor associated with the receiver (output) buffer. The splice system call moves data between two file descriptors without copying between kernel address space and user address space.

When applied to a TCP proxy, the input buffer is the receive socket in a TCP connection between the origin sender and the proxy, or in a TCP connection between the proxy and the receiver. For each TCP connection, as TCP is bi-directional, there are a receive socket and a send socket. Similarly, the output buffer is the send socket in a TCP connection between the original sender and the proxy, or in a TCP connection between the proxy and the receiver.

According to ADD, a data descriptor is a data structure that may be used to access a block of data. If the data is a file, a common embodiment is a file descriptor. In the current Linux OS, a file descriptor is also used to indicate other software constructs—for example, a socket channel. Using splice as an embodiment choice, a data transfer path is a pipe buffer, which comprises an input file descriptor and an output file descriptor. A pipe buffer is an in-kernel elastic memory construct that is opaque to user-space processes.

In the current Linux OS, the splice system call is used to setup a pipe from an input stream to an output stream for data transfer. In the stream mode, the file that links to the input stream and the file that links to the output stream are modified as data arrives and is transferred. According to ADD, to transfer data from the input stream to the output stream, and to simultaneously read from the input stream, a "peeking" (partial read) pipe is setup between the input stream and a read process. This peeking pipe is a fork or copy from the original pipe between the input stream and the output stream. The peeking pipe is set up to transfer data from the input stream to a file for storage. In a caching application, the data read from an input stream is stored in the cache as a file. In the current Linux OS, the peeking pipe is set up through the tee system call.

In caching applications, data from a cached file may be inserted into an output stream—this data may or may not replace some data from the input stream. According to ADD, the insertion of data from a cached file is accomplished by a zero-copy mechanism. In the current Linux OS, this is done using the splice system call from a cached file directly into an output stream.

FIG. 1 shows the data structure and data flow for a Linux-based TCP proxy with caching. The "IN" box 100 is the input socket and the "OUT" box 103 is the output socket, associated with one direction (upstream or downstream) of a TCP session. The arrow labeled "zero-copy" is a mechanism to establish a pipe 101 of 2 data descriptors associated with the input and the output streams. The box "$P_{in}$" 104 represents the input data descriptor, and the box "$P_{out}$" 105 represents the output data descriptor. The arrow labeled "meta-data copy" represents a mechanism to duplicate (or fork) the first pipe 101 of data descriptors to a second ("peek") pipe 102.

In the current Linux OS, the "zero-copy" mechanism is realized by the splice system call; the "meta-data copy" mechanism is realized by the tee system call; the data descriptor is realized by the file descriptor.

ADD also allows partial read/copy from an input stream into user space. This mechanism is called "peek" in FIG. 1. For example, if a TCP session carries an HTTP command, the HTTP command may be "peeked" (partially read) by a "cache inquiry" process 300. The reading of an HTTP command does not have to be completed in its entirety. For example, in a caching application, a partial URL in an HTTP GET command may be sufficient to determine a cache hit.

In FIG. 1, the "File" box 200 represents a stored file, which may be a file containing cached content. When there is a cache hit, the matching cached content may be sent directly from the "File" box 200 to the "OUT" box 103, through the "zero-copy" mechanism, without additional copies.

In FIG. 1, the cache program may store data from the input stream 100 into a cache file 201. The cache program invokes the "zero-copy" mechanism to transfer data from the input stream 100 directly to the "File" 201 (cache content), without additional copies. The peeking pipe 102 contains the meta-data for this transfer.

In FIG. 1, if certain data from the stream input 100 is to be dumped, the data descriptors in the pipe 101 are modified to cause the associated data pointers (such as the file-system pointers) to point to a null object, thereby disassociating the data for further use. This operation is indicated in the diagram with an arrow to "/dev/null" box 301.

FP is a method that further comprises 2 methods. The first method is for assigning processes to different CPUs or cores; the second method is for assigning threads to different CPUs or cores. Both methods minimize cache misses and cache accesses in shared on-chip caches, or equivalently, to maximize cache hits, over multi-core computers.

The first method assigns processes to CPUs or cores based on a priori information regarding the processes and functional proximity of the processes. The second method assigns threads to CPUs or cores according to thread groups, which are created in the run time.

FIG. 2 shows an embodiment of the process structure that utilizes the FP methods, for a TCP proxy with content caching. In this process structure, HTTP/TCP sessions are terminated (or spliced) via various TCP proxies. FIG. 2 depicts TCP proxy 201 for port 80 (ordinary HTTP), TCP proxy 202 for port 8080 (special HTTP port), and TCP proxy 203 for port "xxx". There may be more than 3 TCP proxies, while only 3 proxies are depicted in FIG. 2. Each TCP proxy comprises a group of threads—for example, each thread under TCP-port-80 proxy is a worker (W) 204 thread for an individual TCP session.

In FIG. 2, the watchdog process 101, the REST (representational state transfer) process 103, SNMP (simple network management protocol) process 102, ADMIN (administration) process 100, and the content cache process 301 all are functionally far away from the TCP proxy processes (e.g. process 201, process 202, and process 203). The W (worker)

threads 204 are threads for individual TCP connections. The ADMIN process 100, and the TCP proxy process (e.g. process 201, process 202, and process 203) reside in user space and interact with the kernel 300.

According to the first method of FP, the processes specified in FIG. 2 are assigned to the CPUs according to the table in FIG. 3, which is a CPU mapping. In FIG. 3 there are altogether 32 processors: CPU-0 through CPU-31. In accordance with the first method of FP, the ADMIN process, the watchdog process, SNMP process, and the REST process are assigned to CPU-0; the cache processes are assigned to CPU-1 through CPU-3; the TCP proxy processes are assigned to CPU-4 through CPU-31.

The second method of FP is specifically designed for worker threads in a TCP proxy process, for deploying TCP splicing. The second method of FP assigns one worker thread to perform the proxy function for one TCP connection. Optionally, the method assigns 2 treads to one TCP connection, one thread for one direction (upstream or downstream) between the sender and receiver of the TCP connection.

In the second method of FP, when a request to establish a TCP connection arrives, a thread (or 2 threads) is created for servicing (performing TCP-splice functions) the new TCP connection. The newly created thread (or 2 threads) is joined to a thread group. Each thread group is associated with a CPU or core: all threads in the same thread group are assigned to the CPU or core associated with the group.

The purpose of using thread group is that the TCP connections that arrive around the same time are likely to be correlated. The data carried by these connections are likely to be correlated. Thus, the proximity in time may translate into proximity in data. The proximity in data may increase the cache hit in the on-chip caches.

If 2 threads are created for one TCP connection, one thread is assigned for servicing downstream (from the sender to the receiver) traffic, while the second thread is assigned for servicing upstream (from the receiver to the sender) traffic.

What is claimed is:

1. A computing system for transferring data from an input stream to an output stream, comprising:
   at least one processor component;
   at least one memory component;
   a first kernel buffer, referred to as an input buffer, configured to receive and store the data from the input stream;
   a second kernel buffer, referred to as an output buffer, configured to store and send the data to the output stream;
   a third kernel buffer, referred to as a read cache, configured to store the data as cache; and
   a data structure, referred to as a pipe, implemented as an elastic array of kernel memory units, comprising a first pointer (referred to as an input pointer) pointing to a first block of data, and a second pointer (referred to as an output pointer) pointing a second block of data, while the pipe is configured to hold only pointers to data;
   wherein the computing system is configured to generate a first pipe, having a said input pointer pointing to the first block of data in the input buffer, and a said output pointer pointing to the second block of data in the output buffer;
   wherein the computing system is further configured to move the data from the input buffer to the output buffer, using the first pipe as data transfer path, without employing any intermediate buffer in either kernel space or user space,
   whereby said input pointer in the first pipe, pointing to the first block of data in the input buffer, is moved and becomes the input pointer in the second pipe pointing to the second block of data in the output buffer;
   wherein the computing system is further configured to generate a second pipe, in which said input pointer in the second pipe is identical to said input pointer in the first pipe;
   wherein the computing system is further configured to do a partial read on the data in the input buffer using the second pipe, at the same time when the computing system is moving the data from the input buffer to the output buffer using the first pipe;
   wherein the computing system is further configured to copy the data from the input buffer to the read cache, using the second pipe as a new data transfer path, without employing any intermediate buffer in either kernel space or user space, at the same time when the computing system is moving the data from the input buffer to the output buffer using the first pipe;
   wherein the computing system is further configured to provide TCP (transmission control protocol) splicing between a plurality of TCP senders and a plurality of TCP receivers.

2. The computing system of claim 1, wherein the input stream contains an HTTP (hypertext transfer protocol) command.

3. The computing system of claim 1, wherein a splice system call of a Linux-based operating system is used to move the data from the input buffer to the output buffer using the first pipe.

4. The computing system of claim 1, wherein a splice system call of a Linux-based operating system is used to copy pointers in the first pipe to pointers in the second pipe.

5. A machine-implemented method for transferring data from an input stream to an output stream, comprising:
   providing TCP splicing between a plurality of TCP senders and a plurality of TCP receivers;
   generating a first kernel buffer, referred to as an input buffer, for receiving and storing the data from the input stream;
   generating a second kernel buffer, referred to as an output buffer, for storing and sending the data to the output stream;
   generating a third kernel buffer, referred to as a read cache, for storing data as cache;
   generating a first pointer, referred to as an input pointer, pointing to a first block of data in the input buffer;
   generating a second pointer, referred to as an output pointer, pointing to a second block of data in the output buffer;
   generating an elastic array of kernel memory units, referred to as a first pipe, the first pipe comprising the first pointer identical to the input pointer, and the second pointer identical to the output pointer, while the first pipe is configured to hold only pointers to the data;
   moving the data from the input buffer to the output buffer, using the first pipe as a data transfer path, without using any intermediate buffer either in kernel space or user space,
   whereby said input pointer in the first pipe, pointing to the first block of data in the input buffer, is moved and becomes the input pointer in a second pipe pointing to the second block of data in the output buffer;

generating a second elastic array of kernel memory units, referred to as the second pipe, wherein said input pointer in the second pipe is identical to said input pointer in the first pipe;

partially reading the data in the input buffer using the second pipe, at the same time when a computing system is moving the data from the input buffer to the output buffer using the first pipe; and copying the data from the input buffer to the read cache, using the second pipe as a new data transfer path, without employing any intermediate buffer either in kernel space or user space, at the same time when the computing system is moving the data from the input buffer to the output buffer using the first pipe.

6. The machine-implemented method of claim 5, wherein the input stream contains an HTTP command.

7. The machine-implemented method of claim 5, wherein a splice system call of a Linux-based operating system is used to move the data from the input buffer to the output buffer using the first pipe.

8. The machine-implemented method of claim 5, wherein a splice system call of a Linux-based operating system is used to copy pointers in the first pipe to pointers in the second pipe.

9. A computing system for performing TCP splicing between a server and a client, comprising:

at least one processor component;

at least one memory component;

a first socket, referred to as the server socket, configured to receive data from or send the data to the server;

a second socket, referred to as the client socket, configured to receive the data from or send the data to the client; and a data structure, referred to as a pipe, implemented as an elastic array of kernel memory units, comprising a first pointer (referred to as an input pointer) pointing to a first block of data, and a second pointer (referred to as an output pointer) pointing a second block of data, while the pipe is configured to hold only pointers to data;

wherein the system is configured to generate a first pipe, referred to as a server pipe, having a said input pointer pointing to the first block of data in the server socket, and a said output pointer pointing to the second block of data in the client socket;

wherein the computing system is configured to generate a second pipe, referred to as the client pipe, having a said input pointer pointing to a third block of data in the client socket, and a said output pointer pointing to a fourth block of data in the server socket;

wherein the computing system is further configured to move the data from the server socket to the client socket, using the server pipe as a data transfer path, without employing any intermediate buffer in either kernel space or user space;

wherein the computing system is further configured to move the data from the client socket to the server socket, using the client pipe as a new data transfer path, without employing any intermediate buffer in either kernel space or user space.

* * * * *